United States Patent
Imhof et al.

(10) Patent No.: US 10,018,129 B2
(45) Date of Patent: Jul. 10, 2018

(54) METHOD OF CONTROLLING A DUAL FUEL ENGINE

(71) Applicant: GE Jenbacher GmbH & Co OG, Jenbach (AT)

(72) Inventors: Dino Imhof, Munich (DE); Herbert Schaumberger, Muenster (AT); Mark James Lemke, Sun Prairie, WI (US)

(73) Assignee: GE JENBACHER GMBH & CO OG, Jenbach (AT)

( * ) Notice: Subject to any disclaimer, the term of this patent is extended or adjusted under 35 U.S.C. 154(b) by 23 days.

(21) Appl. No.: 14/876,040

(22) Filed: Oct. 6, 2015

(65) Prior Publication Data
US 2016/0115882 A1 Apr. 28, 2016

(30) Foreign Application Priority Data
Oct. 28, 2014 (AT) .................................. A 789/2014

(51) Int. Cl.
*F02D 41/00* (2006.01)
*F02D 19/06* (2006.01)
(Continued)

(52) U.S. Cl.
CPC ....... *F02D 41/0027* (2013.01); *F02D 19/061* (2013.01); *F02D 19/105* (2013.01);
(Continued)

(58) Field of Classification Search
CPC ..... Y02T 10/36; Y02T 10/32; F02D 41/0025; F02D 41/0027; F02D 19/061;
(Continued)

(56) References Cited

U.S. PATENT DOCUMENTS

| 6,550,430 B2* | 4/2003 | Gray | F02B 1/12 123/27 GE |
| 6,598,584 B2* | 7/2003 | Beck | F02B 1/12 123/299 |

(Continued)

FOREIGN PATENT DOCUMENTS

| CN | 101363372 A | 2/2009 |
| CN | 102112723 A | 6/2011 |

(Continued)

OTHER PUBLICATIONS

European Search Report dated Mar. 22, 2016 in corresponding European Application No. 15002840 (with English translation).
(Continued)

*Primary Examiner* — Long T Tran
(74) *Attorney, Agent, or Firm* — GE Global Patent Operation; Rita D. Vacca

(57) ABSTRACT

In a method of controlling a dual fuel engine in which power in the form of a first gaseous fuel and in the form of a self-igniting second fuel is fed to at least one combustion chamber, a knock signal representative of the combustion chamber is detected. When a knock signal indicating a knock of at least a first intensity is detected, the amount of first fuel fed to the combustion chamber of the engine is increased, the increased introduction of power into the combustion chamber caused by the increase in the amount of first fuel being compensated by a corresponding reduction in the power contribution of the second fuel. When a knock signal indicating a knock of at least a second intensity greater than the first intensity is detected, the amount of first fuel is reduced.

14 Claims, 4 Drawing Sheets

(51) Int. Cl.
*F02D 19/10* (2006.01)
*F02D 35/02* (2006.01)
*F02D 41/30* (2006.01)

(52) U.S. Cl.
CPC ....... *F02D 35/027* (2013.01); *F02D 41/0025* (2013.01); *F02D 41/3047* (2013.01); *F02D 41/0007* (2013.01); *Y02T 10/36* (2013.01)

(58) Field of Classification Search
CPC .. F02D 35/027; F02D 41/403; F02D 19/0647; F02D 19/066; F02D 41/3047
USPC ........................................................ 123/525
See application file for complete search history.

(56) References Cited

U.S. PATENT DOCUMENTS

| | | | |
|---|---|---|---|
| 6,675,748 B2* | 1/2004 | Ancimer | F02B 1/12 123/27 GE |
| 6,947,830 B1* | 9/2005 | Froloff | F02D 35/023 701/111 |
| 7,533,634 B2* | 5/2009 | Ritter | F02B 29/0418 123/27 GE |
| 7,546,834 B1 | 6/2009 | Ulrey et al. | |
| 8,671,911 B2* | 3/2014 | Moren | F02B 69/04 123/305 |
| 2002/0157619 A1* | 10/2002 | Gray | F02B 1/12 123/1 A |
| 2003/0168037 A1* | 9/2003 | zur Loye | F02B 1/04 123/295 |
| 2004/0139943 A1 | 7/2004 | Kern et al. | |
| 2013/0152900 A1 | 6/2013 | Masubuchi | |
| 2013/0255628 A1* | 10/2013 | Moren | F02B 69/04 123/406.29 |
| 2013/0311066 A1 | 11/2013 | Guimaraes et al. | |
| 2014/0209066 A1* | 7/2014 | Fiveland | F02D 19/0626 123/457 |
| 2014/0238340 A1* | 8/2014 | Dunn | F02M 43/00 123/299 |
| 2014/0373822 A1* | 12/2014 | Rosswurm | F02D 41/0027 123/676 |

FOREIGN PATENT DOCUMENTS

| | | |
|---|---|---|
| DE | 10 2011 089 292 | 6/2013 |
| JP | 9-68061 | 3/1997 |
| JP | 0968061 A | 3/1997 |
| JP | 2011-140882 | 7/2011 |
| JP | 2011140882 A | 7/2011 |
| JP | 2012-57470 | 3/2012 |
| JP | 2012057470 A | 3/2012 |
| JP | 2012-159048 | 8/2012 |
| JP | 2012159048 A | 8/2012 |
| JP | 2007-529676 A | 10/2015 |
| WO | 2011/128692 | 10/2011 |
| WO | 2013/092188 | 6/2013 |
| WO | 2013/135945 A1 | 9/2013 |

OTHER PUBLICATIONS

Austrian Search Report dated Feb. 26, 2015 in corresponding Austrian Patent Application No. 789/2014 (with English translation).
Unofficial English Translation of Japanese Office Action issued in connection with corresponding JP Application No. 2015206184 dated Oct. 4, 2016.
Notification of Reasons for Refusal issued in connection with corresponding JP Application No. 2015-206184 dated Jun. 6, 2017.
Machine Translation and First Office Action and Search issued in connection with corresponding CN Application No. 201510705606.X dated Sep. 1, 2017.

* cited by examiner

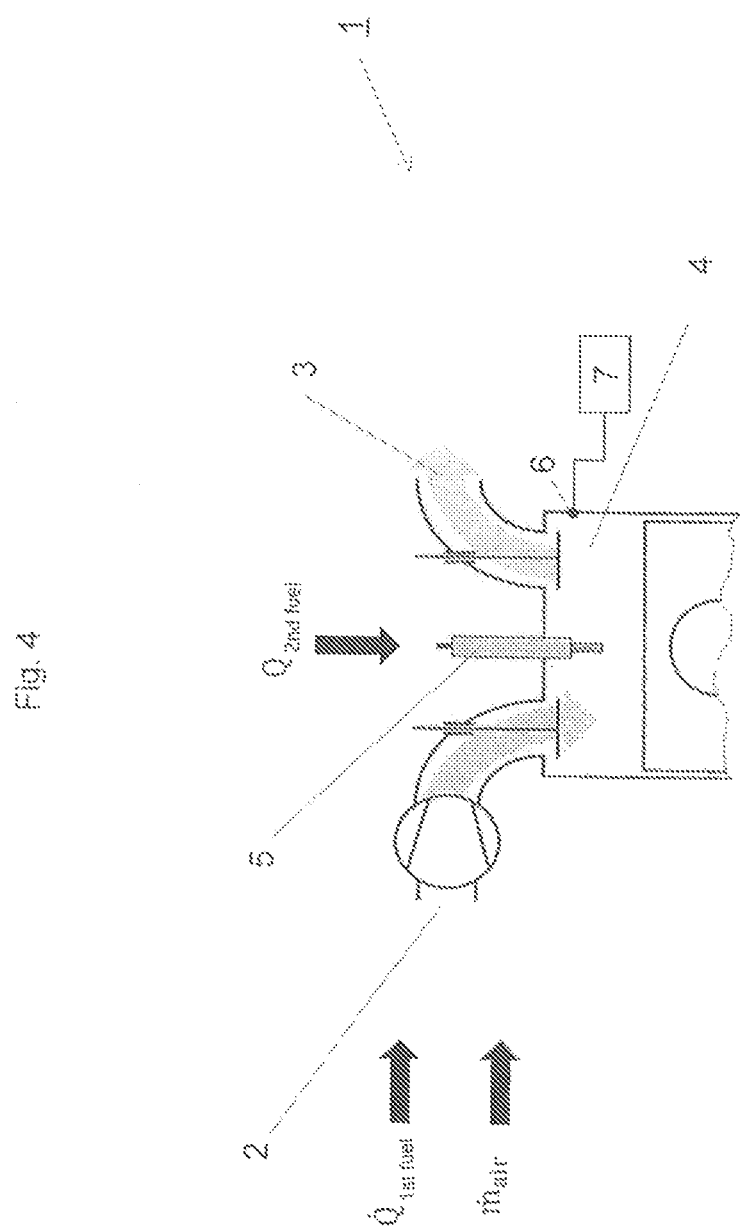

METHOD OF CONTROLLING A DUAL FUEL ENGINE

BACKGROUND OF THE INVENTION

The present invention concerns a method of controlling a dual fuel engine.

Engines of the general kind set forth can be operated in a pure diesel or heavy oil mode or in a so-called dual fuel mode in which the prevailing kind of fuel is a gas, and diesel or heavy oil is used only for supporting ignition. An internal combustion engine of that kind is to be found in U.S. Pat. No. 8,671,911 B2.

That publication provides the arrangement of a knock sensor, by which the occurrence of knock can be detected. Depending on the detection signal a control unit can control the amount of gaseous and liquid fuel to the combustion chambers of the internal combustion engine.

A disadvantage in the state of the art is that retard ignition is necessarily provided as a reaction to the detection of a knock. That control strategy does not take account of the fact that knock can occur for various reasons and it is therefore not always expedient. In many cases, therefore, it may be necessary to take additional measures, as is also described in U.S. Pat. No. 8,671,911 B2 (reduction in the amount of gas introduced).

SUMMARY OF THE INVENTION

The object of the invention is to provide a method of controlling a dual fuel engine of the general kind set forth, and to provide a dual fuel engine which reacts to the occurrence of knock in a more differentiated fashion.

Unlike the situation in the state of the art, the amount of first gaseous fuel which is supplied to the combustion chamber of the engine is not reduced immediately when knock occurs. Quite the contrary, the invention provides (in relation to a working cycle of the dual fuel engine) that the amount of first gaseous fuel is firstly increased (until possibly a higher threshold value is exceeded or the knock dies away). It is to be noted for the present disclosure that the gaseous aggregate state of the first fuel must first occur at the time of combustion.

To keep the total power output of the combustion chamber constant during that working cycle, the power contribution afforded by the second fuel is correspondingly reduced, for example by implementing a reduction in the amount of second fuel introduced and/or a delay in the moment in time of introducing the second fuel and/or a change in the injection characteristic of the second fuel. The amount of the second fuel introduced is a pilot amount, that is—with respect to introduced energy amount—below 5% of the total energy amount introduced in the form of fuel.

In other words, combustion in the at least one combustion chamber is moderated in order to keep the amount of knock in an acceptable limit. That allows operation of the engine at an operating point with the maximum possible proportion of first fuel, which on the one hand is desirable from the point of view of economic considerations and, on the other hand, is advantageous in regard to emission technology.

The intensity of the knock signal is determined from the frequency of the knock events and the strength of the knock events. A knock of high intensity can occur, for example, equally due to frequent light knocking and seldom heavy knocking.

The term injection characteristic is used to denote the shape of the profile of the mass flow of the injected fuel in dependence on time. The area under the profile, that corresponds to the total amount of injected fuel, does not necessarily have to change due to such a change in the shape of the profile. The change in the injection characteristic can be such that the large part of the injected amount of second fuel occurs later. The term "later" is used to mean a later moment in time within the injection event. Variations in the injection characteristic are familiar to the man skilled in the art.

The injection characteristic can also be altered in such a way that the commencement of injection—possibly without a change in the shape of the profile of the mass flow—occurs later. In other words, here the entire injection event takes place later.

It is particularly preferable that the first fuel is mixed with air before introduction into the at least one combustion chamber. Alternatively, a mixture of the first fuel and the air can take place in the at least one combustion chamber prior to actual combustion.

In the event of pre-mixing of the first fuel with air before the at least one combustion chamber, the amount of first fuel, supplied to the at least one combustion chamber can for example be increased in such a way that, even without a change in pressure (charge pressure), the temperature of the mixture of air and first fuel is reduced. Naturally, an increase in the supplied amount of first fuel can also be effected by an increase in the pressure (charge pressure).

It can also be provided that the first fuel is admixed with an air (before the at least one combustion chamber), and the ratio of first fuel and air is increased to increase the amount of first fuel. That measure is possible both in the case of port injection engines (by means of a port injection valve) and also in the case of mixture-charged engines (by means of a gas metering device).

The first gaseous fuel can be, for example, a methane-dominated fuel (for example natural gas), a biogas, a propane gas (LPG), a gasified liquefied natural gas (LNG), a gasified liquefied gas or a gasified gasoline. The second fuel can be for example diesel, vegetable oil or heavy oil.

In the invention, the concept which is known per se for the introduction of diesel or heavy oil in the state of the art, involving multiple injections, can be used for controlling the injection characteristic. In that case, the second fuel is injected in a plurality of intervals. Preferably that concept is employed when a knock signal occurs, which indicates a knock of an intensity which is between the first and second intensities.

As described above in accordance with the invention, the overall power of the combustion chamber must be kept constant during a working cycle of the dual fuel engine. Therefore, the power contribution afforded by the second fuel is appropriately reduced integrated over a working cycle of the dual fuel engine. However, more second fuel can be injected at an earlier crankshaft angle, as long as it is ensured that the overall power contribution is low enough, for example by virtue of suitably later introduction of the remaining injection amount, with correspondingly less efficient combustion.

BRIEF DESCRIPTION OF THE DRAWINGS

Further details of the invention are discussed by way of example with reference to the Figures, in which:

FIG. 4 shows a diagrammatic view of a dual fuel engine.

DETAIL DESCRIPTION OF THE INVENTION

Figure 1:
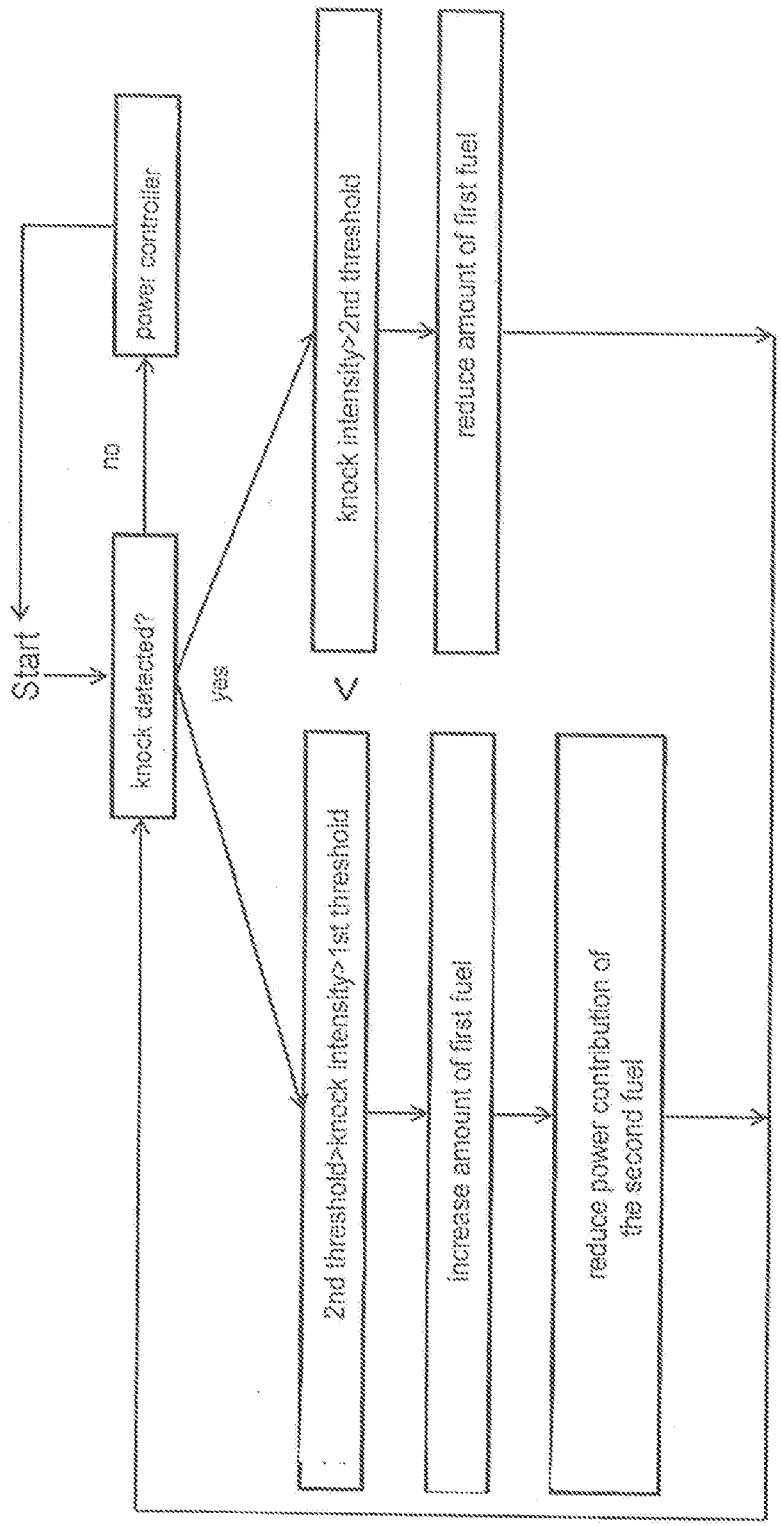
FIG. 1 shows the method as a diagrammatic flow chart in a first embodiment.

FIG. 1 shows the method in a first embodiment in the form of a diagrammatic flow chart. When knock occurs, a distinction is drawn between two branches. In the left-hand branch, the knock intensity is admittedly above the first threshold (that is to say a knock signal is detected which indicates knock above the first intensity), but below the second threshold (that is to say a knock signal is detected which indicates knock below the second intensity). Thereupon, the amount of first fuel which is supplied to the combustion chamber is increased. Subsequently, the increased provision of power caused by increasing the amount of first fuel is compensated for by a reduction in the power contribution of the second fuel.

Possible interventions for reducing the power contribution of the second fuel are, for example, (individually or in any combination) a reduction in the amount of second fuel, a delay in the injection time of the second fuel, the change in the injection rate of the second fuel, and multiple injection of the second fuel. There are also possible ways of indirectly influencing the power contribution of the second fuel, like the reduction in the temperature of the cylinder charge or an increase in charge pressure and so forth.

If the knock intensity exceeds the second threshold, then that is counteracted with a reduction in the amount of first fuel which is supplied to the at least one combustion chamber. That is shown in the right-hand branch in FIG. 1. Subsequently, both branches lead back to the knock detection unit again. If no knock is detected, then engine management is dominated by the normal power controller which corresponds to the state of the art and therefore does not have to be described in greater detail here. In accordance with this embodiment, therefore, the power controller is arranged parallel to the knock control circuit. The knock control circuit comes into operation only when knock is detected.

Figure 2:
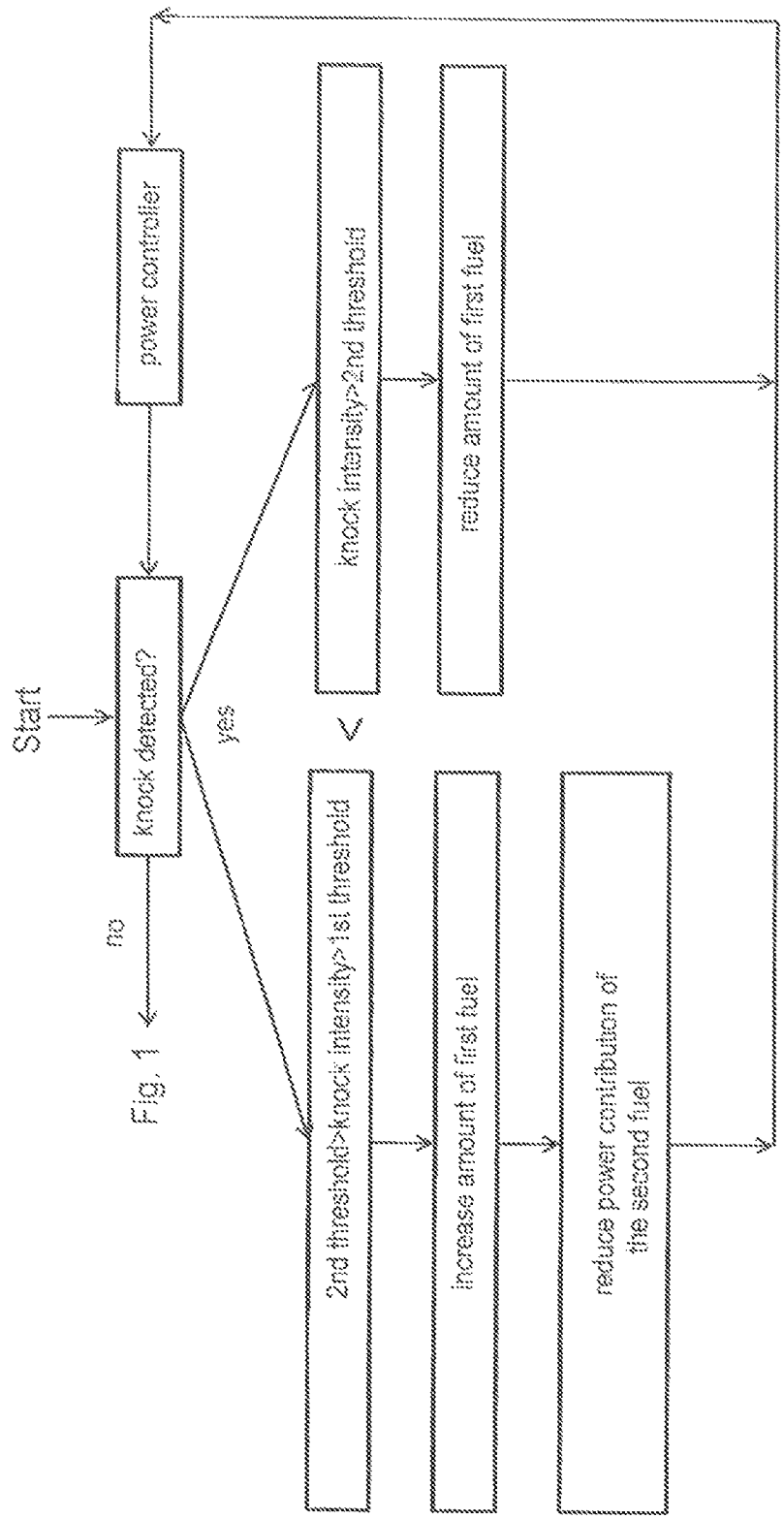
FIG. 2 shows the method as a diagrammatic flow chart in a further embodiment.

An alternative embodiment is shown in FIG. 2. In this embodiment, the power control circuit is connected in series with the knock control circuit. This means that, after implementation of the control interventions described with reference to FIG. 1, in the case of knocking, the loop leads directly to the power controller. Here, therefore, knock detection is to be viewed as part of the power controller. It becomes active only when knock is detected. If no knock signal occurs the same control takes place as in FIG. 1 at the point "Start".

In FIGS. 1 and 2, the power control circuit is designed in accordance with the state of the art. In the case of a stationary dual fuel engine (for example in a genset), the power presetting can be implemented for example in the form of a torque or a rotary speed. In the case of dual fuel engine in a motor vehicle, the power presetting can be effected for example in the form of a speed demand.

Figure 3:
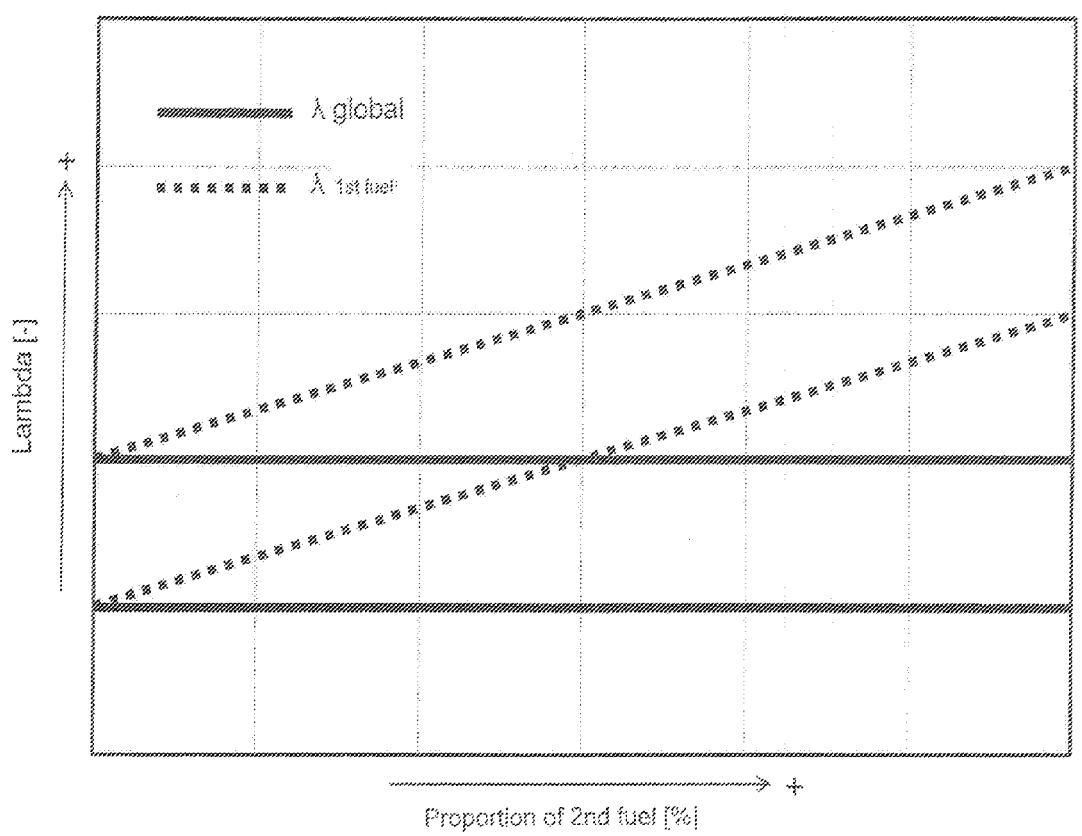
FIG. 3 shows a graph in respect of lambda in relation to the substitution rate.

FIG. 3 shows a chart illustrating the combustion-air ratio lambda depending on the proportion of the second fuel, expressed in percent of the power contribution. At the origin of the graph, the proportion of the second fuel is "zero". Two sets of curves are shown for different charge pressures. The lower curve set which is composed of a solid line and dotted line represents the case for a lower charge pressure, the upper curve set for a higher charge pressure.

The solid line represents the global lambda, that is to say the air ratio in relation to both fuels. The lambda in relation to the first fuel is shown as the dotted line. A greater lambda signifies a lean mixture. It will be seen that, even upon a change in the power contribution of the second fuel, the global lambda, that is to say the global mixture composition, remains constant in respect of its stoichiometric ratio to the combustion air. That is achieved in that, with an increasing proportion of second fuel, the lambda of the first fuel (shown in broken line) is increased. An increase in lambda in fact signifies a higher degree of dilution (that is to say, a weakening of the mixture). The graph clearly illustrates how it is possible to keep the global combustion air ratio constant even with a change in proportion of second fuel.

FIG. 4 diagrammatically shows a combustion chamber of a dual fuel engine 1 according to the invention. The combustion chamber has an inlet and an exhaust side. By way of the induction manifold 2, an amount $Q_{1stfuel}$ of fuel is supplied to the combustion chamber 4 within a unit of time, that is to say a "Q-point" of a first fuel (1st fuel), $\dot{Q}_{1stfuel}$ Expressed in units that is a power as chemical energy is introduced within a unit of time. A mass flow (mass per time) of air is also introduced into the combustion chamber, in the Figure this is identified as $\dot{m}_{air}$. As the respective power contributions of the fuels are crucial in connection with the present application, it should be emphasized at this point that, for the power contribution of a fuel, it is not just the—typically volumetrically or gravimetrically measured—amount of supplied fuel that is decisive. By per se known measures, the power development of a supplied amount of fuel in the combustion chamber can be varied. An example is the change in an ignition timing. Alternative measures like a change in the injection characteristic were discussed in the description. The supplied amount is therefore not to be equated with the corresponding power contribution, rather a possibly implemented measure for varying the power development is also taken into account for same.

The supply of first fuel and air into the induction manifold 2 is clearly shown by black arrows. The Figure also shows an injection unit 5, by way of which the second fuel (2nd fuel) can be introduced into the combustion chamber. The amount of second fuel per unit of time is identified in the Figure as $\dot{Q}_{2ndfuel}$. The supply of second fuel is also indicated by a black arrow. The Figure also indicates a knock sensor 6, by which a knock signal representative of the at least one combustion chamber 4 can be fed to an open-loop or closed-loop control device 7 of the dual fuel engine 1.

LIST OF REFERENCES USED 1 dual fuel engine
2 intake manifold
3 exhaust manifold
4 combustion chamber
5 injection unit
6 knock sensor
7 open-loop or closed-loop control device
λ combustion air ratio lambda

The invention claimed is:

1. A method of controlling a dual fuel engine in which power in form of a gaseous first fuel and in form of a self-igniting second fuel is fed to a combustion chamber of the dual fuel engine, the method comprising:

detecting a knock signal representative of the combustion chamber;

upon occurrence of a knock signal, indicating a knock of at least a first intensity, increasing an amount of the gaseous first fuel fed to the combustion chamber of the engine, and compensating for an increased introduction of power into the combustion chamber caused by the increase in the amount of the gaseous first fuel by providing a corresponding reduction in power contribution of the self-igniting second fuel; and upon occurrence of a knock signal, indicating a knock of at least a second intensity, the second intensity being greater than the first intensity, reducing the amount of the gaseous first fuel fed to the combustion chamber.

2. The method as set forth in claim 1, wherein the corresponding reduction in the power contribution of the self-igniting second fuel is effected by at least one of (i) reducing the amount of the self-igniting second fuel introduced to the combustion chamber, (ii) delaying a moment in time for introduction of the self-igniting second fuel, and (iii) changing an injection characteristic of the self-igniting second fuel.

3. The method as set forth in claim 2, wherein the reduction in the power contribution of the self-igniting second fuel is effected at least in part by changing an injection characteristic of the self-igniting second fuel, the injection characteristic being changed so that a larger portion of an injected amount of the self-igniting second fuel is fed to the combustion chamber at a later moment in time within an injection event.

4. The method as set forth in claim 2, wherein the reduction in the power contribution of the self-igniting second fuel is effected at least in part by changing an injection characteristic of the self-igniting second fuel, the injection characteristic being changed so that a commencement of injection occurs at a later moment in time within an injection event.

5. The method as set forth in claim 4, wherein the commencement of injection occurs without a change in a shape of a profile of a mass flow of the injected second fuel over time.

6. The method as set forth in claim 1, wherein the gaseous first fuel is admixed with air to produce a mixture, and temperature of the mixture of the air and the gaseous first fuel is reduced to increase the amount of the gaseous first fuel.

7. The method as set forth in claim 1, wherein a charge pressure of the gaseous first fuel is increased to increase the amount of the gaseous first fuel.

8. The method as set forth in claim 1, wherein the gaseous first fuel is admixed with air, and a ratio of the gaseous first fuel and the air is increased to increase the amount of the gaseous first fuel.

9. The method as set forth in claim 1, wherein an extent of the increase in the amount of the gaseous first fuel is based on an intensity of the knock signal.

10. The method as set forth in claim 9, wherein the extent of the increase in the amount of the gaseous first fuel is proportional to the intensity of the knock signal.

11. The method as set forth in claim 1, wherein the self-igniting second fuel is injected in a plurality of intervals.

12. The method as set forth in claim 1, wherein the self-igniting second fuel is a liquid.

13. A dual fuel engine comprising:
a combustion chamber to which power is supplied in a form of a gaseous first fuel and in a form of a self-igniting second fuel;
a control device for controlling the dual fuel engine, the control device being one of an open-loop control device or a closed-loop control device; and
a knock sensor arranged on the combustion chamber for providing a knock signal, representative of the combustion chamber, to the control device of the engine;
wherein the control device is configured to:
upon occurrence of a knock signal, indicating a knock of at least a first intensity, increase an amount of the gaseous first fuel fed to the combustion chamber of the engine, and compensate for the increased introduction of power into the combustion chamber caused by the increase in the amount of gaseous first fuel by providing a corresponding reduction in power contribution of the self-igniting second fuel, and
upon occurrence of a knock signal, indicating a knock of at least a second intensity, the second intensity being greater than the first intensity, reduce the amount of the gaseous first fuel fed to the combustion chamber.

14. The engine as set forth in claim 13, wherein the self-igniting second fuel is a liquid.

* * * * *